(12) United States Patent
Nakae et al.

(10) Patent No.: US 7,753,152 B2
(45) Date of Patent: Jul. 13, 2010

(54) COOLING DEVICE FOR CONSTRUCTION MACHINE

(75) Inventors: Yoshihide Nakae, Komatsu (JP); Karl R. Dommert, Chattanooga, TN (US)

(73) Assignee: Komatsu Ltd., Tokyo (JP)

( * ) Notice: Subject to any disclaimer, the term of this patent is extended or adjusted under 35 U.S.C. 154(b) by 296 days.

(21) Appl. No.: 11/226,464

(22) Filed: Sep. 15, 2005

(65) Prior Publication Data

US 2008/0023174 A1    Jan. 31, 2008

(51) Int. Cl.
*F01P 5/06* (2006.01)
(52) U.S. Cl. .................. 180/68.1; 165/122; 165/41
(58) Field of Classification Search .............. 165/41, 165/121, 122, 124; 180/68.1
See application file for complete search history.

(56) References Cited

U.S. PATENT DOCUMENTS

| | | | | | |
|---|---|---|---|---|---|
| 1,958,995 | A | * | 5/1934 | Green | 52/666 |
| 2,866,399 | A | * | 12/1958 | Thompson | 454/329 |
| 3,063,357 | A | * | 11/1962 | Eberhart | 454/320 |
| 3,834,478 | A | * | 9/1974 | Alexander et al. | 180/68.6 |
| 4,371,047 | A | * | 2/1983 | Hale et al. | 180/68.1 |
| 4,454,926 | A | * | 6/1984 | Akins | 180/68.1 |
| 4,696,361 | A | * | 9/1987 | Clark et al. | 180/68.4 |
| D296,332 | S | * | 6/1988 | Sheets | D15/28 |
| 6,092,616 | A | * | 7/2000 | Burris et al. | 180/68.1 |
| 6,435,264 | B1 | * | 8/2002 | Konno et al. | 165/41 |
| 2002/0053480 | A1 | | 5/2002 | Pack | |
| 2003/0015361 | A1 | * | 1/2003 | Bland | 180/68.1 |
| 2005/0077062 | A1 | * | 4/2005 | Fukazawa et al. | 172/776 |

FOREIGN PATENT DOCUMENTS

| | | | |
|---|---|---|---|
| FR | 2860812 | | 4/2005 |
| JP | 57091314 A | * | 6/1982 |
| JP | 08-156612 | | 6/1996 |
| JP | 08-200065 | | 8/1996 |
| JP | 08200065 A | * | 8/1996 |
| JP | 2000-297640 | | 10/2000 |
| JP | 2004-352089 | | 12/2004 |

* cited by examiner

*Primary Examiner*—Allen J Flanigan
(74) *Attorney, Agent, or Firm*—Global IP Counselors

(57) ABSTRACT

In a bulldozer, a radiator module is separated from an engine and is disposed on the rear of the bulldozer. Louver plates on the upper portion of a grill are installed so as to cover the outside of the radiator module and point in a substantially horizontal direction. Louver plates on the lower portion of the grill point diagonally upward.

25 Claims, 9 Drawing Sheets

COOLING DEVICE FOR CONSTRUCTION MACHINE

BACKGROUND OF THE INVENTION

1. Field of the Invention

The present invention relates to a cooling device mounted on a construction machine such as a bulldozer or the like.

2. Background Information

A radiator unit that includes both a radiator and an oil cooler is conventionally arranged in or near the engine room of a construction machine such as a bulldozer, a hydraulic shovel, a crawler crane, or the like, and serves to cool the engine.

For example, Patent Document 1 shows a cooling device for a small shovel, in which the louver plates in a louver device are adjusted so that the air that has passed through the radiator and oil cooler and heated will be discharged diagonally upward.

This solves the problem of high temperature exhaust gas striking workers or others who are working around the small shovel and making them feel uncomfortable.

[Patent Document 1]

Japanese Patent Application Publication H08-200065 (published Aug. 6, 1996)

[Patent Document 2]

Japanese Patent Application Publication 2000-297640 (published Oct. 24, 2000)

[Patent Document 3]

Japanese Patent Application Publication H08-156612 (published Jun. 18, 1996)

However, the conventional cooling device for a construction machine described above has the following problems.

In other words, because the louver plates in the louver device are pointed diagonally upward, high temperature exhaust gas from the radiator will strike an operator in the operator's seat of, for example, a bulldozer when there is a radiator disposed on the rear thereof and the bulldozer moves rearward. This may make the operator feel uncomfortable.

In particular, with a bulldozer or the like in which the engine is disposed forward of the operator's seat, and the radiator is disposed to the rear thereof, so that the operator's ability to see during work will be improved, there will be times in which exhaust gas from the radiator that is disposed to the rear of the operator's seat will easily flow toward the operator when the bulldozer is moving backward, and thus will make the operator feel uncomfortable during work.

An object of the present invention is to provide a cooling device for a construction machine that is capable of preventing high temperature exhaust gas from flowing toward an operator in the operator's seat, and preventing a decline in the ability of the operator to work.

SUMMARY OF THE INVENTION

A cooling device for a construction machine according to a first aspect of the invention is a cooling device that is disposed to the rear of the construction machine such that an operator's seat is interposed between an engine disposed on the front of the construction machine and the cooling device, and is comprised of a radiator, a fan, and a cover member. The radiator supplies cooling water to the engine. The fan is disposed in a position that faces the radiator. The cover member is installed so as to cover the radiator, and has a plurality of louver plates that form air channels disposed along an air flow formed by the fan. In addition, amongst the plurality of louver plates, the louver plates disposed on an upper portion of the cover member are disposed along a horizontal direction or along a direction that points downward from the horizontal direction, and the louver plates disposed on the lower portion of the cover member are disposed along a direction that points upward from the horizontal direction.

With the cooling device disposed on the rear of a construction machine, amongst the plurality of louver plates that form air channels in the cover member that is installed so as to cover the radiator included in the cooling device, the directions in which the louver plates on the upper portion and lower portion of the cover member point are different.

Normally, with a construction machine such as a bulldozer or the like, the louver plates that form the air channels are disposed to point in a diagonally upward direction, so that tree branches and the like are not inserted into the air channels when the bulldozer moves backward and thereby damage the radiator, and dirt is not stirred up thereby during movement. However, when the louver plates are disposed to point diagonally upward in this manner, high temperature exhaust will be discharged diagonally upward from the air channels. Because the operator's seat is near the radiator and disposed in a position that is higher than the radiator in standard construction machines such as bulldozers or the like, the high temperature exhaust discharged diagonally upward may flow toward the operator in the operator's seat, and make the operator feel uncomfortable. In particular, with a bulldozer or the like in which the radiator is disposed such that the operator's seat is interposed between the engine disposed on the front of the bulldozer and the radiator, high temperature exhaust discharged from the cooling device may directly strike the operator when the bulldozer moves backward.

With the cooling device for a construction machine of the present invention, amongst the plurality of louver plates that form the air channels in the cover member installed so as to cover the radiator, the louver plates disposed on the upper portion of the cover member near the operator's seat point in a horizontal direction or lower.

In this way, the high temperature exhaust gas discharged from the cooling device can either be discharged horizontally or diagonally downward. As a result, the quantity of high temperature exhaust that flows toward the operator from the cooling device when, for example, a construction machine such as a bulldozer or the like moves backward can be controlled, and a reduction in the comfort level of the operator while operating the bulldozer can be prevented. Furthermore, because the louver plates are disposed to point diagonally upward on the lower portion of the cover member, work can be comfortably performed without stirring up dirt and sand while operating the bulldozer.

The cooling device for a construction machine according to a second aspect of the present invention is the cooling device for a construction machine of the first aspect, in which the louver plates disposed so as to point in a horizontal direction or point downward from the horizontal direction are disposed above the portion of the cover member that faces a rotation shaft of the fan.

Here, the position that corresponds to the upper portion of the cover member in which the louver plates point in a horizontal direction or lower is based upon the position of the rotation shaft of the fan.

Thus, the louver plates on the cover member that are disposed above the rotation shaft of the fan that is disposed so as to face the radiator will point in a horizontal direction or lower. As a result, the flow of high temperature exhaust toward the operator in the operator's seat can be controlled, and the comfort of the operator while operating the construction machine can be improved.

The cooling device for a construction machine according to a third aspect of the present invention is the cooling device for a construction machine of the first aspect, in which the louver plates disposed so as to point in a horizontal direction or point downward from the horizontal direction are disposed above the portion of the cover member that faces a central portion of the radiator.

Here, the position that corresponds to the upper portion of the cover member in which the louver plates point in a horizontal direction or lower is based upon the central portion of the radiator in the vertical direction.

Thus, the louver plates on the cover member that are disposed in a position that corresponds to the upper half of the radiator will point in a horizontal direction or lower. As a result, the flow of high temperature exhaust toward the operator in the operator's seat can be controlled, and the comfort of the operator while operating the construction machine can be improved.

The cooling device for a construction machine according to a fourth aspect of the present invention is the cooling device for a construction machine of the first aspect, in which the louver plates disposed so as to point in a horizontal direction or point downward from the horizontal direction are disposed on at least the upper one third of the cover member.

Here, the position that corresponds to the upper portion of the cover member in which the louver plates point in a horizontal direction or lower is based upon the cover member.

Thus, the louver plates on the cover member that are disposed in a position that corresponds to the upper one third of the cover member will point in a horizontal direction or lower. As a result, the flow of high temperature exhaust toward the operator in the operator's seat can be controlled, and the comfort of the operator while operating the construction machine can be improved.

The cooling device for a construction machine according to the fifth aspect of the present invention is the cooling device for a construction machine according to any one of the first to fourth aspects, in which the cover member has a diagonal surface that slants downward toward the rear between an upper end surface and a rear end surface when viewed laterally, and the louver plates disposed so as to point in a horizontal direction or point downward from the horizontal direction are disposed along the diagonal surface.

Here, the diagonal surface that slants downward to the rear is arranged between the upper end surface and the rear end surface of the cover member when the construction machine is viewed laterally. In addition, louver plates that point in the horizontal direction or lower are disposed along the diagonal surface.

Thus, the flow of high temperature exhaust discharged from the louver plates arranged on the upper portion of the cover member toward the operator in the operator's seat can be controlled. As a result, a reduction in the ability of the operator to work while operating the construction machine can be prevented.

According to the cooling device for a construction machine of the present invention, the quantity of high temperature exhaust gas that will flow from the cooling device toward the operator when, for example, a construction machine such as a bulldozer or the like moves backward can be controlled, and thus a decline in the ability of an operator to work can be avoided.

BRIEF DESCRIPTION OF THE DRAWINGS

Referring now to the attached drawings which form a part of this original disclosure.

DETAILED DESCRIPTION OF THE PREFERRED EMBODIMENTS

FIGS. 1-8 will be employed below to describe a radiator module (cooling device) 31 mounted on a bulldozer (construction machine) 10 according to one embodiment of the present invention.

Overall Construction of the Bulldozer 10

Figure 1:
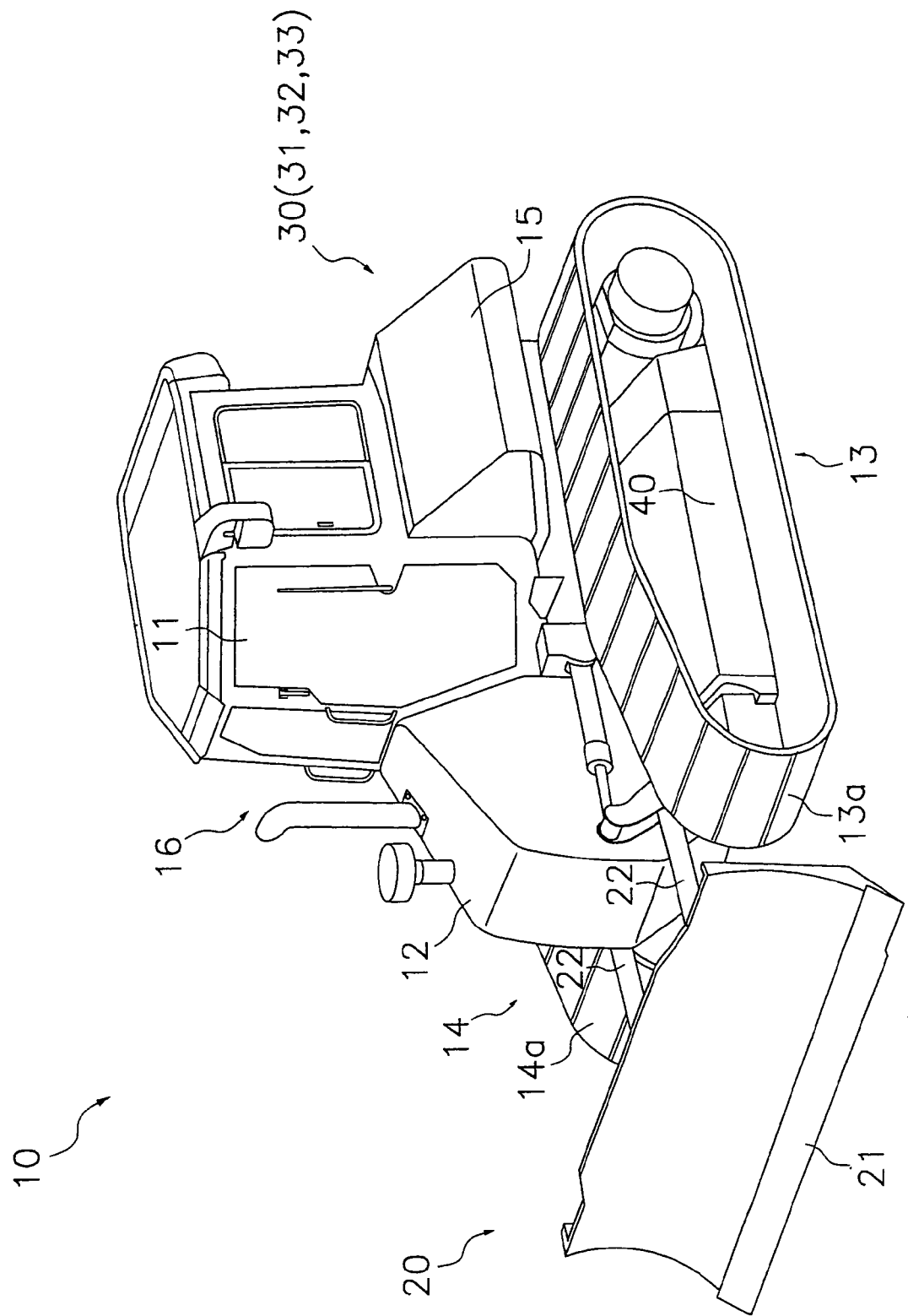
FIG. 1 is a front oblique view of a bulldozer according to an embodiment of the present invention.
Figure 2:
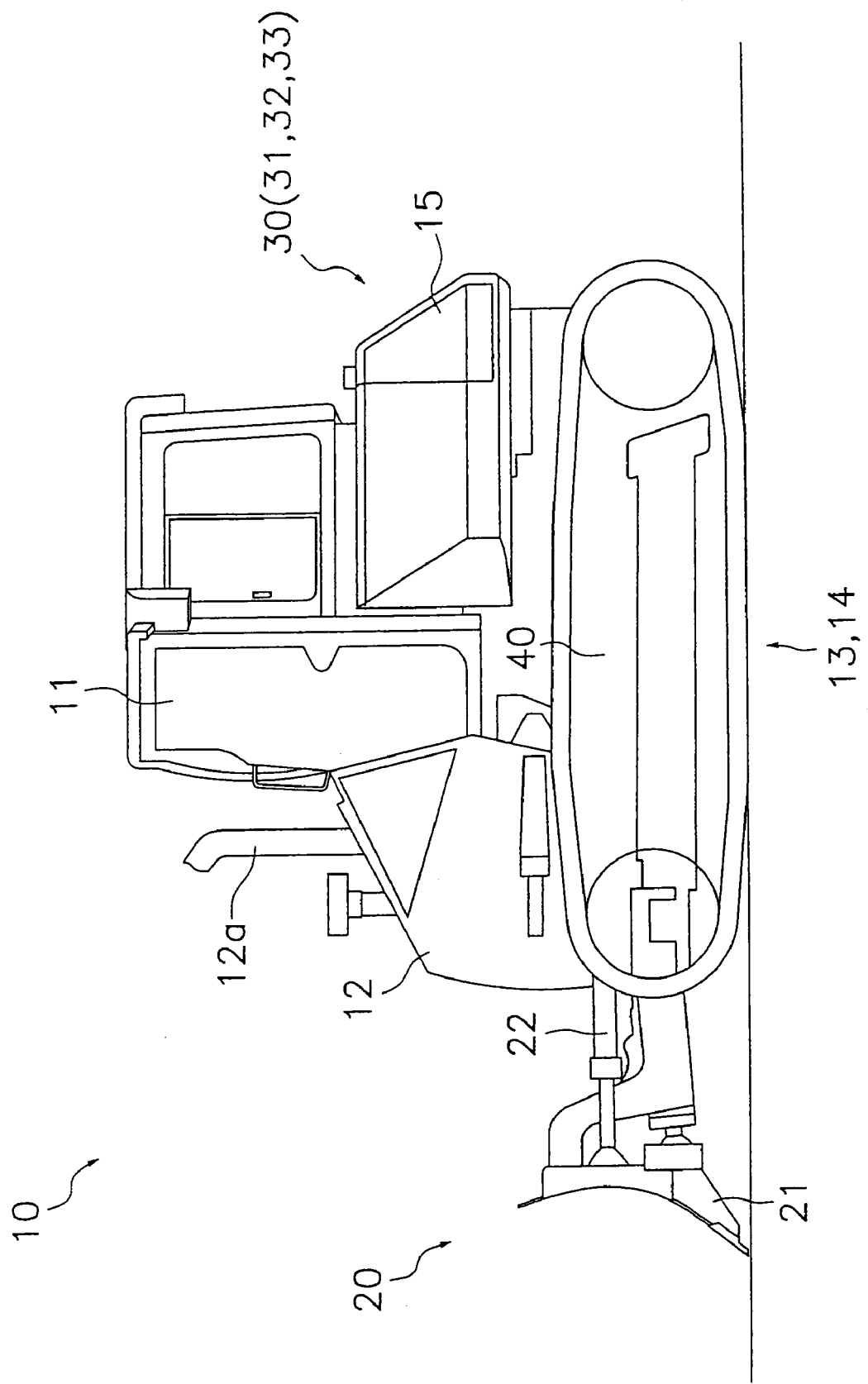
FIG. 2 is a lateral view of the bulldozer shown in FIG. 1.
Figure 3:
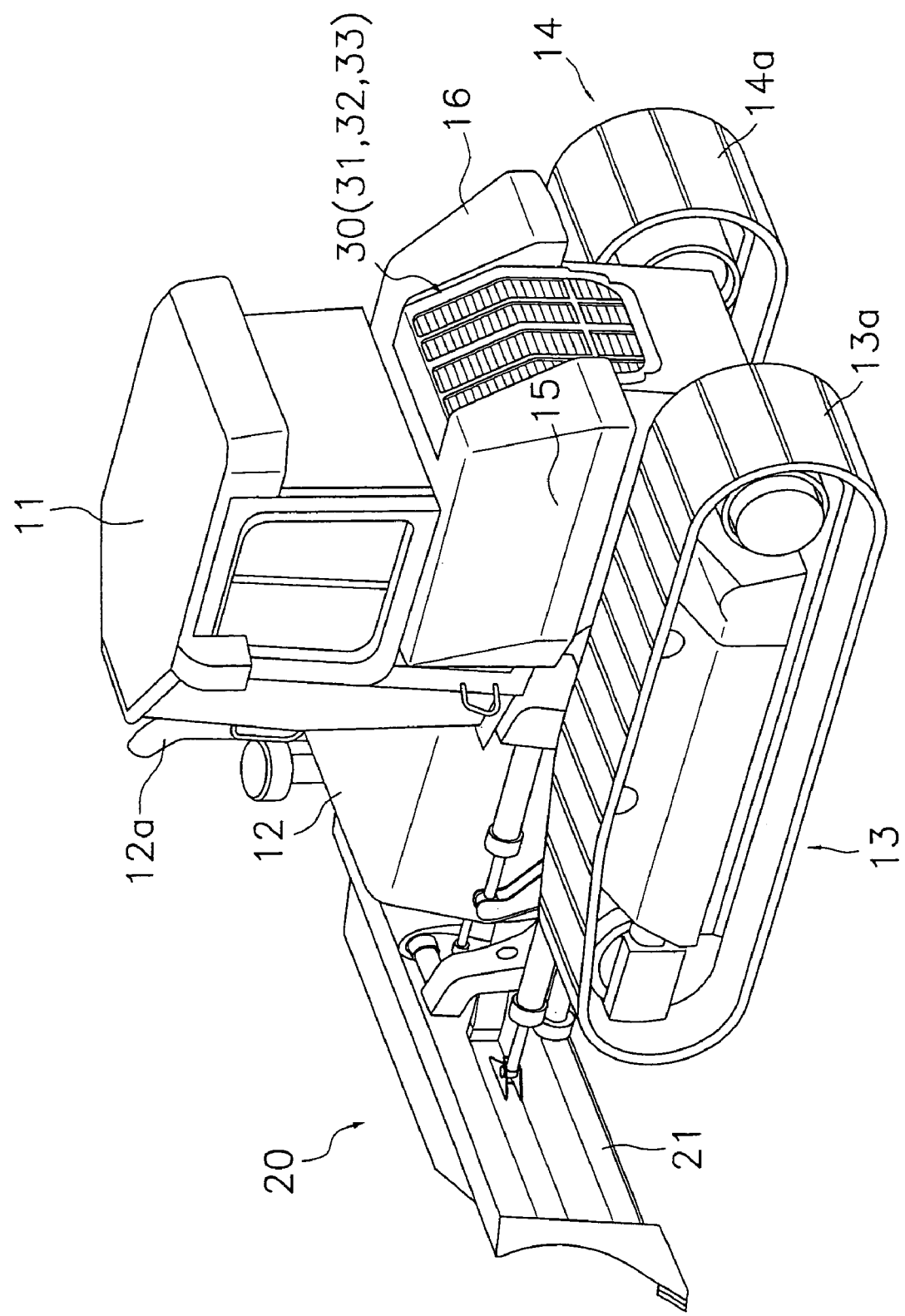
FIG. 3 is a rear oblique view of the bulldozer shown in FIG. 1.
Figure 4:
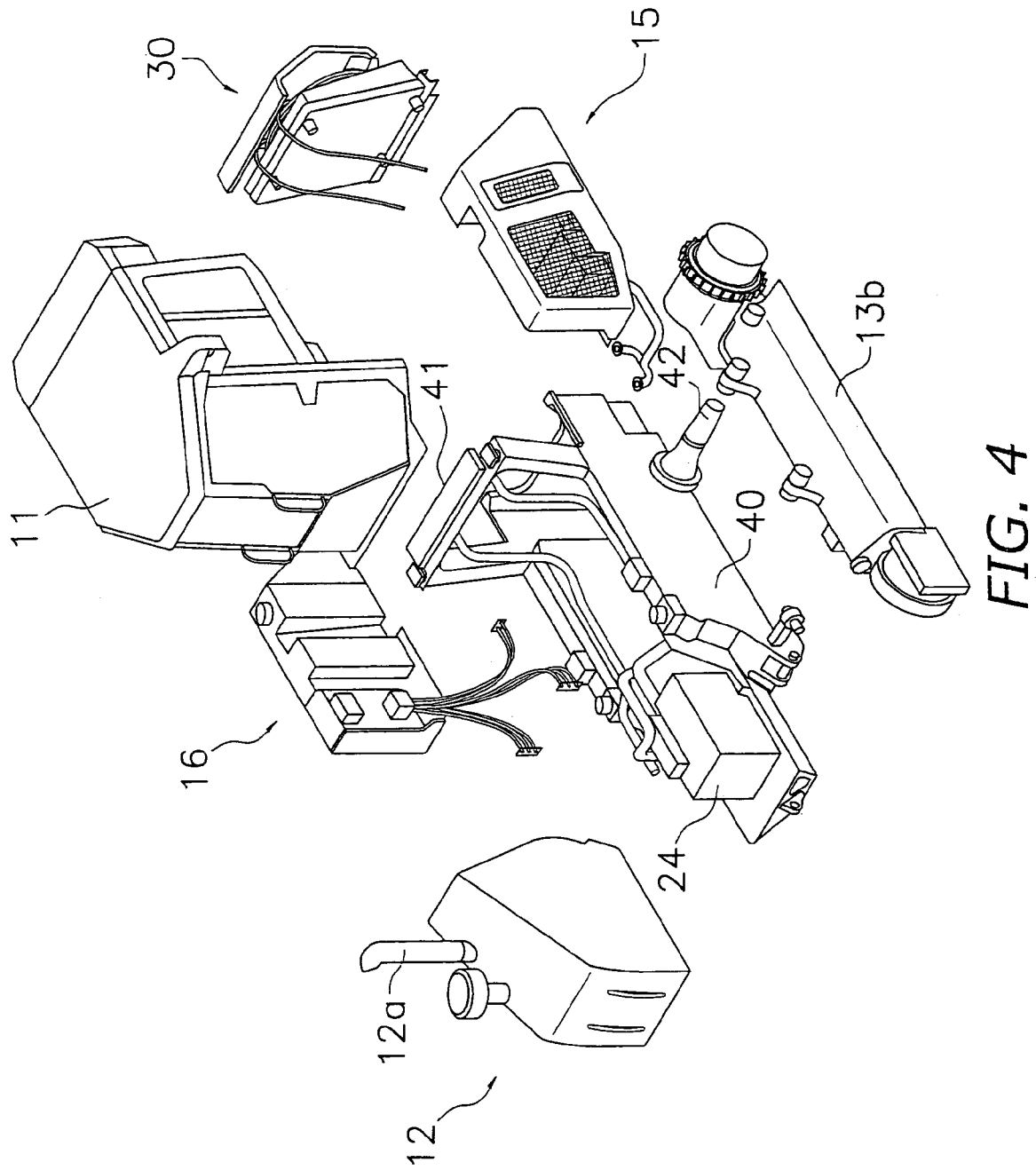
FIG. 4 is a partial oblique view showing a frame structure that comprises the bulldozer shown in FIG. 1.

As shown in FIGS. 1 to 3, the bulldozer 10 of the present embodiment is comprised of a cab (operator's seat) 11, nose module 12, left and right drive devices 13, 14, fuel tank module 15, a hydraulic oil module 16, a work device 20, a radiator module 30, and a main frame 40.

Built into the interior of the cab 11 is a seat for the operator of the bulldozer 10 to sit, and levers, pedals, and gauges for various operations. The cab 11 has a rollover protection structure (hereinafter referred to as an ROPS), and is disposed on the rear of the main frame 40 (described below).

The nose module 12 accommodates an engine 24 (refer to FIG. 4) in the interior thereof, and is installed forward of the cab 11. The nose module 12 forms a cover structure, and has holes opened therein that allow the air intake port of the air cleaner and the exhaust pipe of the engine 24 to pass therethrough. Because of this, exhaust gas noises of the engine 24 that emanate from the exhaust pipe 12a that projects out from the nose module 12 will be dampened by means of a muffler (not shown the figures), and thus engine noises can be prevented from leaking out, and a bulldozer having little drive noise can be obtained.

In addition, the intrusion of dust and dirt into the nose module 12 is prevented by making the nose module 12 into a cover structure. In this way, friction in the moving parts of the engine 24, such as the pulleys and belts for the alternator and the air conditioner compressor (none of which are shown in the figures), due to dust and dirt will be prevented, and reliability will be improved. Note also that in order to prevent the intrusion of dust and dirt from the air intake port formed in the nose module 12, a pre-cleaner and a filter inside the air cleaner are provided.

Furthermore, the exhaust pipe 12a is installed on the nose module 12 so as to extend upward from the upper surface thereof. In addition, when viewed from the operator inside the cab 11, the exhaust pipe 12a is erected in a position that overlaps with a pillar that forms the cab 11. This prevents a reduction in the ability of the operator inside the cab 11 to see forward due to the exhaust pipe 12a.

The drive devices 13, 14 are installed on both lateral sides of the main frame 40 described below (see FIG. 4), and are capable of driving over irregular surfaces by rotating crawler tracks 13a, 14a having plurality of plate shaped shoes linked together to form an endless ring, and winding them around a plurality of vertically disposed rotating wheels.

The fuel tank module 15 accommodates a fuel tank on the inner side of the cover. The fuel tank stores fuel that is supplied to the engine 24 (see FIG. 4) mounted in the interior of the nose module 12, and is installed on the left side surface of the cab 11.

The hydraulic oil module 16 accommodates a hydraulic oil tank that stores hydraulic oil that is supplied to the transmission system and the work equipment system, and is installed on the right side surface of the cab 11.

Figure 5:
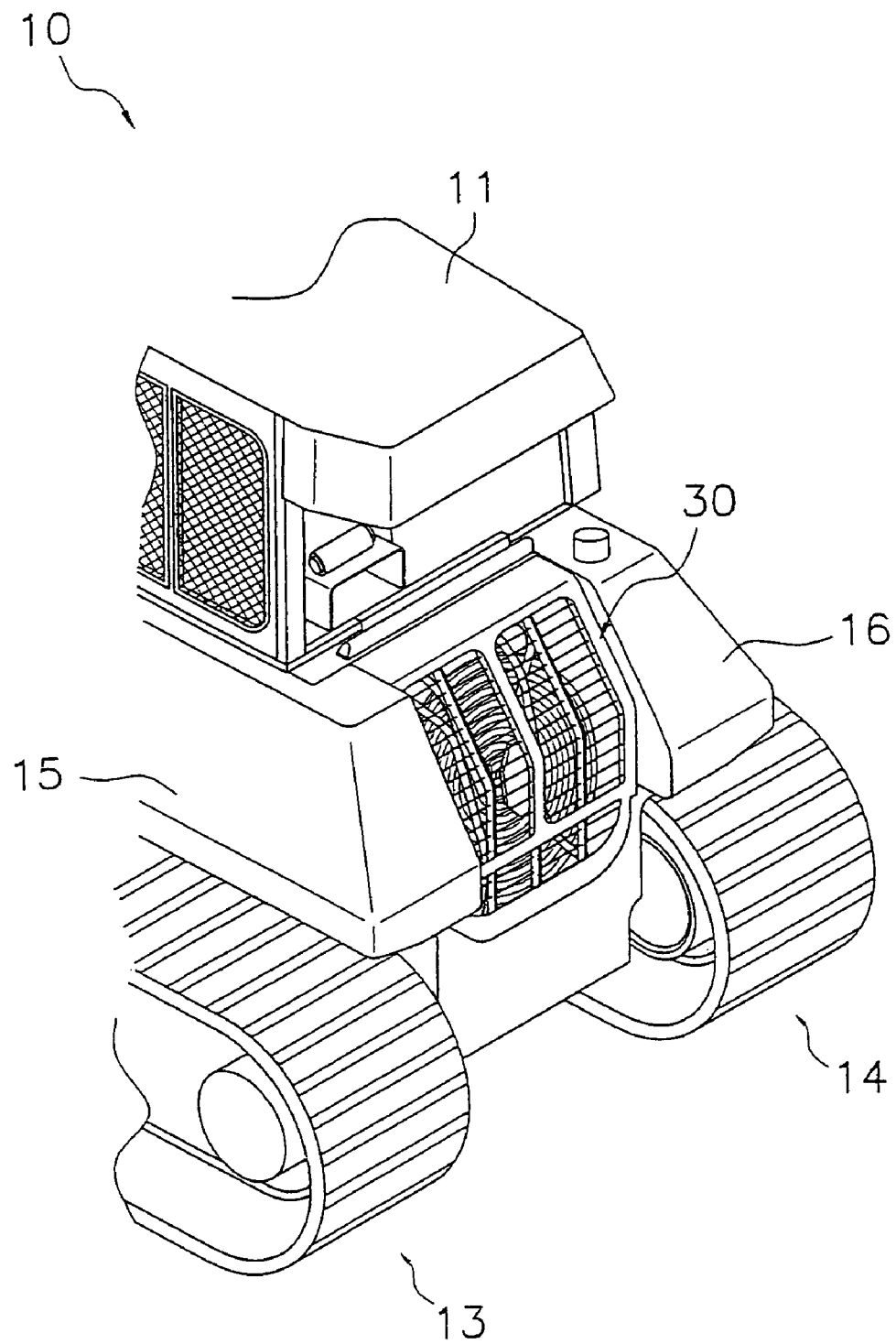
FIG. 5 is an enlarged view showing the construction of the rear side of the bulldozer shown in FIG. 1.

The radiator module 30 is a cooling device that serves to cool the engine 24 (see FIG. 4), and as shown in FIG. 5, is disposed to the rear of the cab 11 so as to be interposed between the two left and right tank modules 15, 16. As shown in FIG. 5, the radiator module 30 is disposed in a position that is set back from the rear ends of the covers of each tank module 15, 16. Because of this, the radiator module 30 can be protected from external obstructions, and the work situation to the rear of the radiator module 30 can be easily confirmed when the operator looks rearward from the cab 11. As a result, even in situations in which a ripper or a winch is installed on the rear of the bulldozer 10, the work equipment to the rear of the radiator module 30 can be confirmed from the cab 11 while work is being performed.

The work device 20 has a blade 21 and a hydraulic cylinder 22, and the blade 21 will be tilted and moved in the desired direction by extending and contracting the hydraulic cylinder 22.

The radiator module 30 is to the rear of the cab 11, and is installed on the most rearward end of the main frame 40.

The main frame 40 is a base member that forms the skeleton of the bulldozer 10. Items mounted on the main frame 40 include the work device 20 on the front thereof, the drive devices 13, 14 (the track frame modules 13b, 14b) on the left and right sides thereof, and the nose module 12, the gate frame 41 described below (see FIG. 4), the cab 11, the fuel tank module 15, and the hydraulic oil tank module 16 on the upper portion thereof.

Structure of the Radiator Module 30

Figure 6:
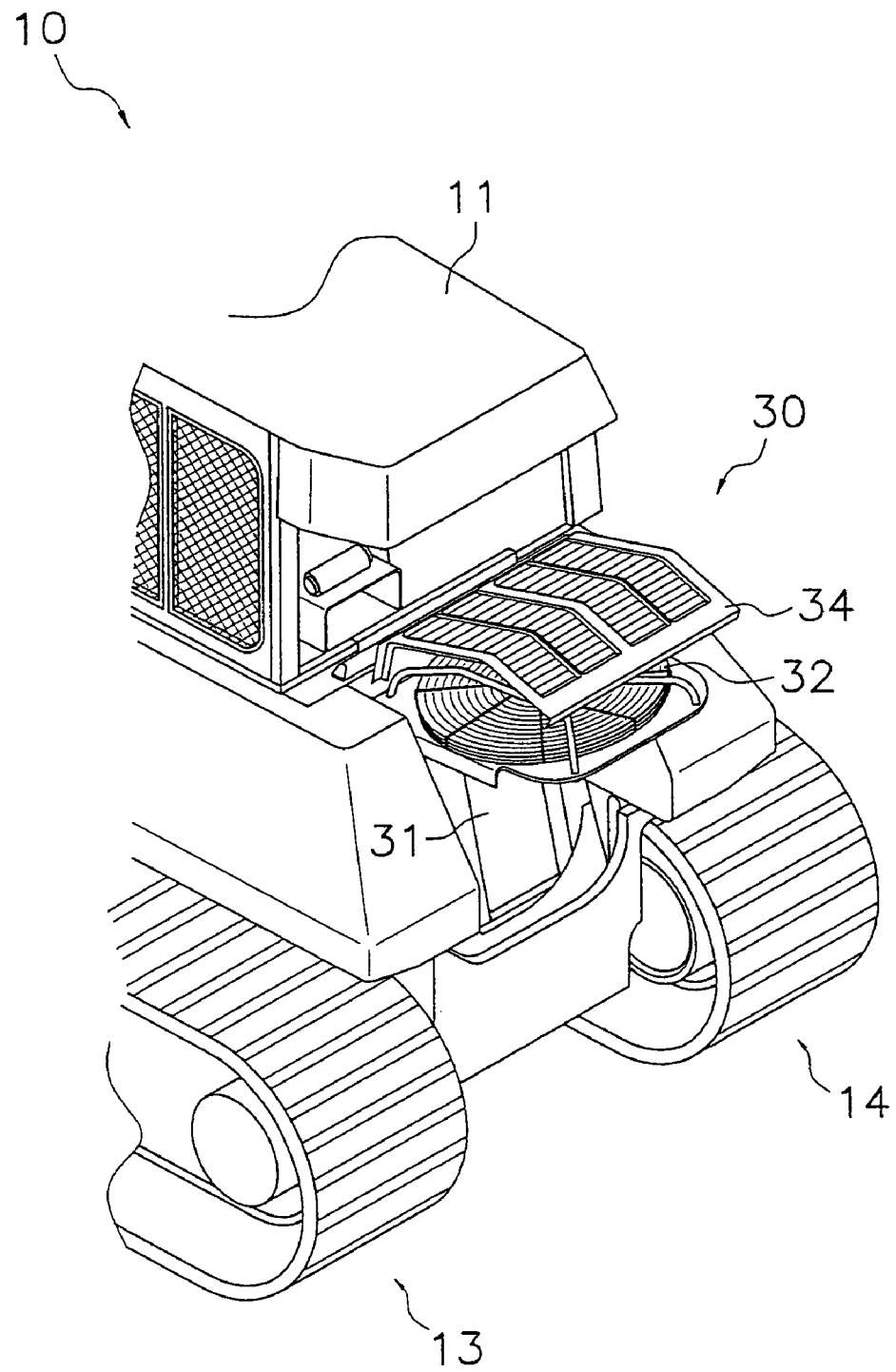
FIG. 6 is a view showing a radiator module in the open state that is installed on the rear side of the bulldozer shown in FIG. 5.
Figure 7:
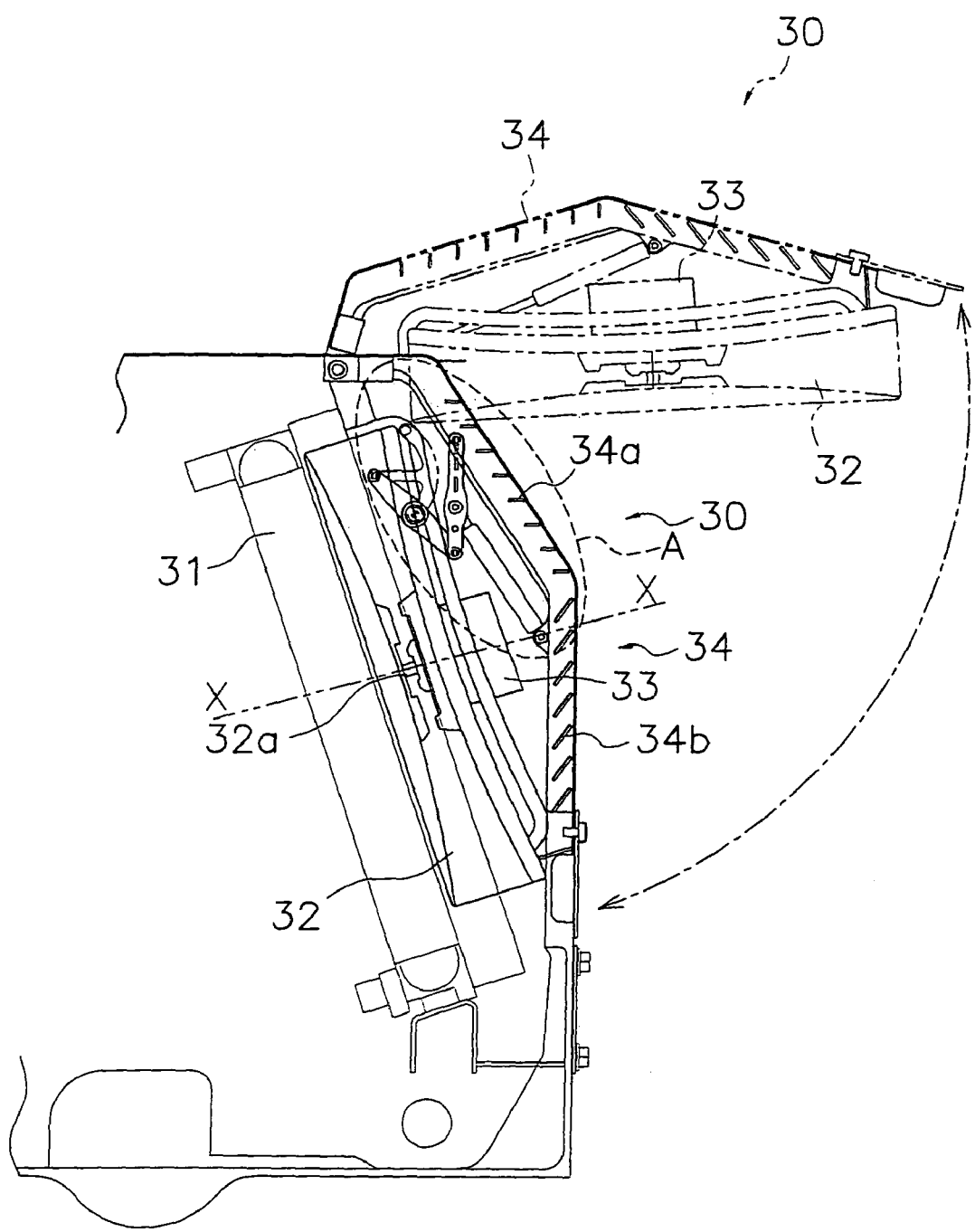
FIG. 7 is a lateral view showing the radiator module of FIG. 6.

As shown in FIG. 7, the radiator module 30 includes a radiator 31, a fan 32, a motor 33, and a grill (cover member) 34. In addition, as shown in FIG. 6, cleaning and maintenance of the radiator 31, the fan 32, and the grill 34 is performed by rotating the radiator module 30 around a rotational axis located on the upper end thereof.

The radiator 31 is disposed on the innermost side of the radiator module 30, and performs heat exchange between cooling water and air in order to cool the engine 24.

The fan 32 is arranged in front of the radiator 31 so as to face the same, and by rotating the fan 32 by means of the motor 33, a flow of air will be formed that passes through the radiator 31. In addition, as shown in FIG. 7, when the grill 34 is placed into the open state, the fan 32 will rotate upward together with the grill 34. This is because the lower end of the fan 32 is connected with the lower end of the grill 34. Thus, by rotating both the grill 34 together with the fan 32 and temporarily fixing them in the upper position, tasks such as cleaning and maintenance of the radiator 31, the fan 32, and the like can be easily performed.

The motor 33 is connected with a rotation shaft 32a of the fan 32, and rotates the fan 32 in order to form a flow of air for cooling the cooling water that flows inside the radiator 31.

The grill 34 is disposed on the outermost side of the radiator module 30, and is installed so as to cover the radiator 31, the fan 32, and the motor 33 described above. In addition, as shown in FIGS. 6 and 7, the grill 34 rotates around a rotational axis located on the upper end thereof, and the fan 32 and the motor 33 will both be temporarily fixed on the upper position by means of an open/close mechanism 44 described below (see FIG. 8).

Figure 8:
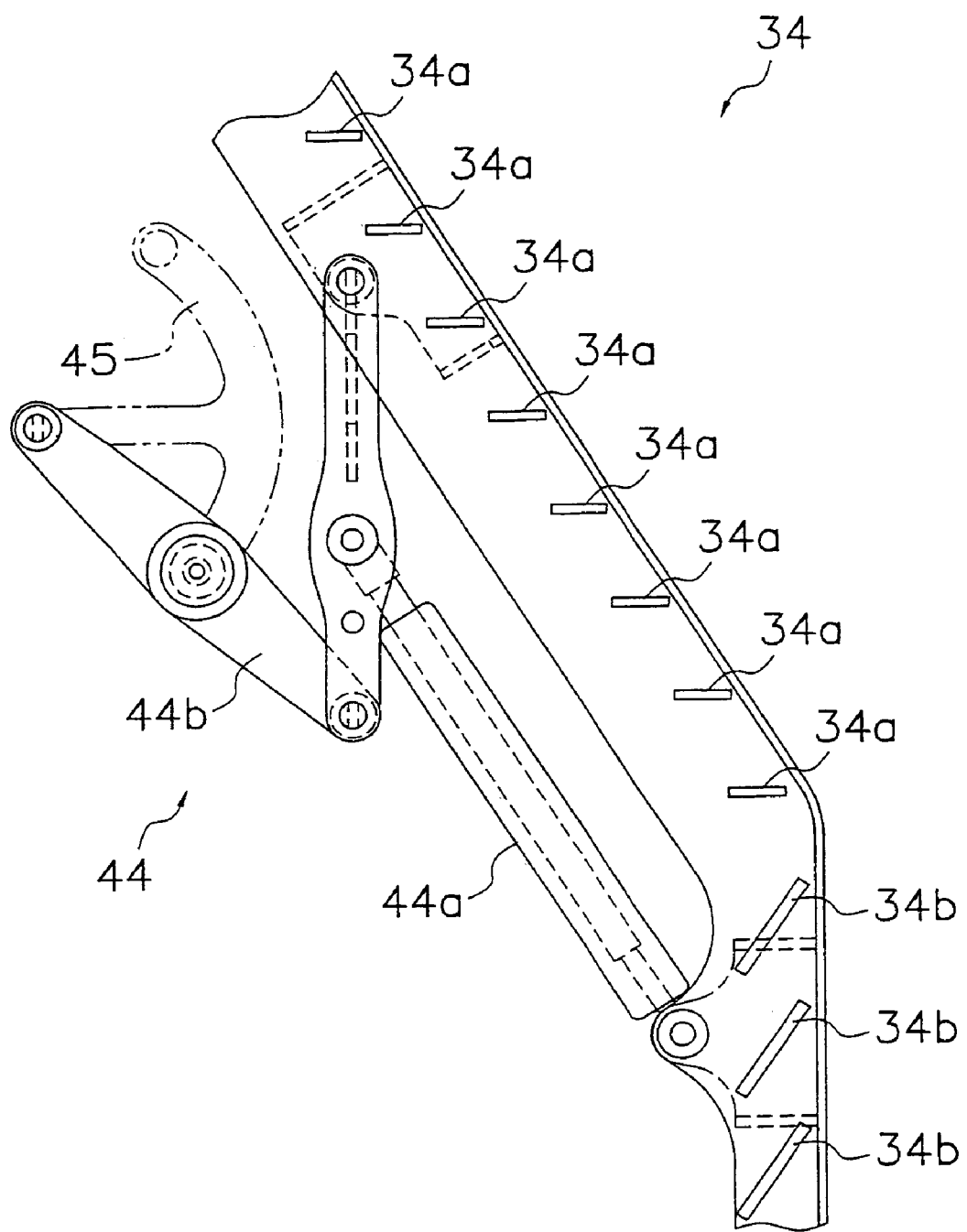
FIG. 8 is an enlarged view of the portion A of FIG. 7.

As shown in FIG. 8, the open/close mechanism 44 includes a gas damper 44a, and a link mechanism 44b that can be flexed in the central portion thereof. One end of the gas damper 44a is linked with a portion of the link mechanism 44b, and the other end of the gas damper 44a is connected with a portion of the grill 34. During opening and closing, the gas damper 44a will extend and contract while applying an urging force or a resistance force in association with the movement of the grill 34. One end of the link mechanism 44b is linked to an attachment (not shown in the figures) disposed near the upper portion of the grill 34, and the other end of the link mechanism 44b is linked to a portion of the grill 34. A portion of the link mechanism 44b moves along a groove 45 formed in the attachment (not shown in the figures). When the grill 34 is raised upward, a portion of the link mechanism 44b will move along the groove 45 to the upper end thereof, and will be locked in place at that location. In this way, the grill 34 can be temporarily fixed and maintained in the open state.

Furthermore, the grill 34 includes louver plates 34a, 34b that form air channels in order to externally discharge air that passes through the radiator 31.

The louver plates 34a, 34b are members that determine the discharge direction of the air that is externally discharged, and as shown in FIG. 8, the louver plates 34a disposed on the upper portion of the grill 34 are installed in a direction that is different than that of the louver plates 34b disposed on the lower portion of the grill 34.

As shown in FIG. 8, the louver plates 34a are installed along the portion of the grill 34 that is diagonal when viewed laterally, and each louver plate 34a is disposed in a substantially horizontal direction. Because of this, air that has passed through the radiator 31 and been heated will be discharged from the upper portion of the grill 34 in a substantially horizontal direction. Thus, even in situations in which, for example, the bulldozer 10 has moved backward or a breeze is blowing from the rear of the bulldozer 10, it will be possible to avoid high temperature air discharged from the radiator module 30 being blown toward the operator in large amounts. In particular, with a configuration like that of the present embodiment in which the radiator module 30 is disposed immediately to the rear of the cab 11, air discharged from the radiator module 30 may flow toward the operator inside the cab 11. However, as noted above, by pointing the louver plates 34a on the upper portion of the grill 34 near the operator in a substantially horizontal direction, the quantity of high temperature air that will flow toward the operator can be dramatically reduced.

As shown in FIG. 8, the louver plates 34b are installed along the portion of the grill 34 that is vertical when viewed laterally, and each louver plate 34b is disposed so as to point diagonally upward. Because of this, air that has passed through the radiator 31 and heated will be discharged diagonally upward from the central portion to the lower portion of the grill 34. By pointing the louver plates 34b on the lower portion of the grill 34 diagonally upward, damage to the radiator 31, the fan 32, and the like that occurs when tree branches and the like are inserted between the louver plates 34b when the bulldozer 10 moves backward can be prevented.

In addition, when the louver plates installed on the lower portion of the grill 34 are disposed so as to point diagonally downward, the exhaust from the radiator during the operation of the bulldozer 10 will directly strike the ground and produce a dust cloud. In contrast, with the bulldozer 10 of the present embodiment, the louver plates 34b on the lower portion of the grill 34 are pointed in the diagonally upward direction. In this way, the production of dust clouds due to the air discharged from the radiator module 30 can be avoided.

In addition, with the bulldozer 10 of the present embodiment, the radiator 31 is separately and independently disposed to the rear of the cab 11 rather than inside the nose module 12. In this way, the size and shape of the nose module 12 can be selected in accordance with its relationship with the engine 24. As a result, the nose module 12 will be reduced in size and the exterior surface thereof will be sloped forward, and thus it will be possible to see beyond the nose module 12 so that the upper portion of the blade 21 is visible from the cab 11, and the forward visibility will be dramatically improved.

Furthermore, the radiator module 30 is disposed more forward (inward) than the rear ends of the fuel tank module 15 and the hydraulic tank module 16 when viewed laterally. Because of this, the space in front of the radiator module 30 will not be obstructed by equipment such as the fuel tank module 15 and the like. In this way, the path for the large quantity of air used to cool the radiator module 30 can be maintained, and overheating can be prevented even when the outdoor air temperature is high. In addition, by disposing the radiator module 30 in a position that is recessed forward of the rear ends of the equipment on the left and right sides thereof, damage to the radiator module 30 can be prevented.

Special Characteristics of the Radiator Module 30

(1) In the bulldozer 10 of the present embodiment, the radiator module 30 is separated from the engine 24 and disposed to the rear thereof, and as shown in FIG. 7, the louver plates 34a, 34b are disposed on the grill 34 that covers the outer side of the radiator module 30 so as to point in different directions on the upper and lower portions of the grill 34. More specifically, the louver plates 34a on the upper portion of the grill 34 point in a substantially horizontal direction, and the louver plates 34b on the lower portion of the grill 34 point diagonally upward.

Thus, because the louver plates 34a on the upper portion of the grill 34 point in the substantially horizontal direction, high temperature air discharged from the radiator module 30 can be prevented from flowing toward the operator inside the cab 11 disposed near the radiator module 30, and this can prevent the operator from feeling uncomfortable while operating the bulldozer 10. In addition, because the louver plates 34b on the lower portion of the grill 34 point diagonally downward, problems such as the insertion of tree branches and the like into the radiator 31 can be prevented while the bulldozer 10 is being operated, and there will be no dust clouds produced from the air discharged from the radiator module 30 while the bulldozer 10 is being operated.

As a result, a bulldozer 10 can be obtained in which there will be no reduction in the ability of the operator to work, and the comfortable operation thereof will be made possible.

(2) In the bulldozer 10 of the present embodiment, amongst the louver plates 34a, 34b disposed on the grill 34 that forms the radiator module 30, the louver plates 34a disposed above the position of the grill 34 that faces the rotation shaft 32a of the fan 32 (line X-X in FIG. 7) are pointed in a substantially horizontal direction.

Thus, by establishing the rotation shaft 32a of the fan 32 as the lowest vertical point at which the louver plates 34a are disposed in the substantially horizontal direction, high temperature gas discharged from the upper portion of the radiator module 30 a short distance away from the cab 11 can be prevented from flowing toward the operator inside the cab 11 in large quantities. As a result, a reduction in the ability of the operator to work while operating the bulldozer 10 can be prevented.

(3) In the bulldozer 10 of the present embodiment, the grill 34 that forms a portion of the radiator module 30 has a substantially horizontal surface, a diagonal surface, and a substantially vertical surface when viewed laterally. In addition, the louver plates 34a disposed in the substantially horizontal direction are arranged on the diagonal surface of the grill 34.

(4) Thus, high temperature air discharged from the diagonal portion of the grill 34 that is positioned on the uppermost portion thereof can be prevented from flowing toward the operator inside the cab 11 disposed a short distance away from the upper portion of the radiator module 30. As a result, a reduction in the ability of the operator to work while operating the bulldozer 10 can be prevented.

Other Embodiments

An embodiment of the present invention was described above, however the present invention is not limited to the aforementioned embodiment, and various modifications thereof are possible within a range that does not depart from the essence of the invention.

(A) In the aforementioned embodiment, the louver plates 34a that are installed in a substantially horizontal direction on the grill 34 that forms a portion of the radiator module 30 are disposed above the position thereon that faces the rotation shaft 32a of the fan 32. However, the present invention is not limited to this configuration.

Figure 9:
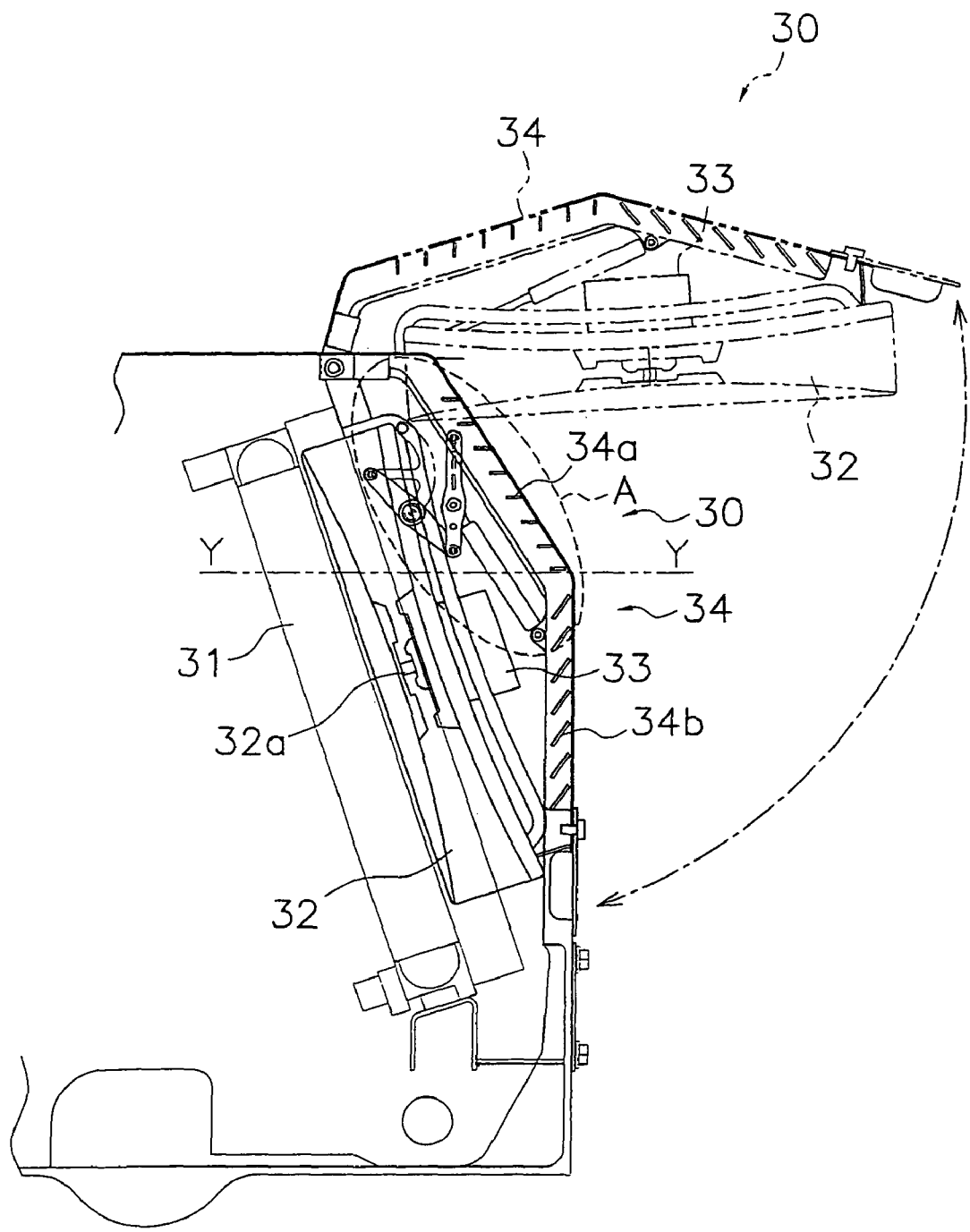
FIG. 9 a lateral view showing a radiator module mounted on a bulldozer according to another embodiment of the present invention.

For example, as shown in FIG. 9, even when the lowest position of the louver plates 34a disposed in the substantially horizontal direction (line Y-Y in FIG. 9) is above the portion that faces the central position of the radiator 31 in the vertical direction, the same effects as those of the aforementioned embodiment can be obtained.

In addition, even if the lowest position of the louver plates 34a disposed in the substantially horizontal direction (line Y-Y in FIG. 9) is disposed on the upper one third of the grill 34, the same effects as those of the aforementioned embodiment can be obtained.

(B) In the aforementioned embodiment, the louver plates 34a that are installed on the upper portion of the grill 34 that forms a portion of the radiator module 30 are disposed in a substantially horizontal direction. However, the present invention is not limited to this configuration.

For example, the louver plates 34a can also be disposed diagonally downward. In this configuration, like when the louver plates 34a are disposed in the substantially horizontal direction, high temperature air can be prevented from flowing toward the operator in the cab 11. Here, air that is discharged in the diagonally downward direction may strike the ground and produce a dust cloud. However, no dust cloud will be produced with this configuration because the louver plates 34a are disposed on the upper portion of the grill 34, and there is a long distance between the louver plates 34a and the ground. Thus, even when the louver plates 34a are pointed diagonally downward, the same effects as with the aforementioned embodiment can be obtained.

(C) In the aforementioned embodiment, the louver plates 34*a* disposed in the substantially horizontal direction are only installed on the diagonal portion of the grill 34 when viewed laterally. However, the present invention is not limited to this configuration.

For example, regardless of the shape of the grill 34, the louver plates 34*a* disposed in the substantially horizontal direction may be installed on only a portion of the diagonal portion when viewed laterally, or the louver plates 34*a* may be disposed on the lower portion below the diagonal portion.

(D) In the aforementioned embodiment, the grill 34 that forms a portion of the radiator module 30 has a horizontal surface, a diagonal surface, and a vertical surface when viewed laterally. However, the present invention is not limited to this configuration.

For example, it is also possible to employ a substantially rectangular shaped grill having only a horizontal and vertical surface when viewed laterally. Even with this configuration, the same effects as with the aforementioned embodiment can be obtained by pointing the louver plates disposed on the upper portion of the grill in the same direction as in the aforementioned embodiment.

(E) In the aforementioned embodiment, the present invention was applied to a radiator module mounted on a bulldozer. However, the present invention is not limited to this configuration.

For example, the present invention can also be applied to a cooling device mounted on a construction machine such as a hydraulic shovel, a wheel loader, and the like.

INDUSTRIAL APPLICABILITY

The cooling device for a construction machine of the present invention can prevent high temperature exhaust from striking the operator in the operator's seat of a construction machine, and can prevent a reduction in the ability of the operator to work while operating the construction machine, and thus can be broadly applied to cooling devices mounted in various construction machines such as a bulldozer, wheel loader, and hydraulic shovel.

What is claimed is:

1. A covered radiator/cooling fan arrangement for a construction machine, wherein the construction machine operates on a ground surface that defines a horizontal direction, comprising:
    a radiator;
    a fan disposed adjacent to the radiator; and
    a cover member disposed adjacent to and covering the radiator such that the fan is disposed between the radiator and the cover member, wherein the cover member comprises an upper portion, a lower portion, and a plurality of louver plates that form air channels disposed along an air flow formed by the fan with each of the louver plates being an elongated flat plate extending between side walls of the cover member, wherein, amongst the plurality of louver plates, the louver plates disposed on the upper portion of the cover member are disposed along the horizontal direction or along a direction that points downward from the horizontal direction and the louver plates disposed on the lower portion of the cover member are disposed along a direction that points upward from the horizontal direction, wherein the upper portion is angled with respect to the lower portion, and wherein the fan and the cover member pivot with respect to the radiator to provide access to the radiator.

2. The covered radiator/cooling fan arrangement for a construction machine according to claim 1, wherein
    the louver plates on the upper portion of the cover member are disposed above a portion of the cover member that intersects with an axis defined by a rotation shaft of the fan.

3. The covered radiator/cooling fan arrangement for a construction machine according to claim 1, wherein
    the louver plates on the upper portion of the cover member are disposed above a portion of the cover member that faces the central portion of the radiator.

4. The covered radiator/cooling fan arrangement for a construction machine according to claim 1, wherein
    the lower portion of the cover member is vertically disposed with respect to the horizontal direction.

5. The covered radiator/cooling fan arrangement for a construction machine according to claim 4, wherein
    the upper portion of the cover member inclines upwardly from a top of the lower portion, in a direction toward the radiator.

6. The covered radiator/cooling fan arrangement for a construction machine according to claim 1, further comprising:
    an open/close mechanism connected to the cover member to facilitate opening and closing of the cover member.

7. The covered radiator/cooling fan arrangement for a construction machine according to claim 6, wherein
    the open/close mechanism comprises a gas damper and a link mechanism, the gas damper being connected at a first end to the cover member and at a second end to the link mechanism, the link mechanism being connectable to the construction machine.

8. The covered radiator/cooling fan arrangement for a construction machine according to claim 1, wherein
    the radiator is disposed at an angle with respect to both the upper portion and the lower portion of the cover member.

9. The covered radiator/cooling fan arrangement for a construction machine according to claim 4, wherein
    the cover member has a V-shape defining an apex pointing in a direction away from the radiator.

10. The covered radiator/cooling fan arrangement for a construction machine according to claim 1, wherein
    the radiator and the fan are both disposed at an angle with respect to the horizontal direction.

11. The covered radiator/cooling fan arrangement for a construction machine according to claim 10, wherein
    the radiator and the fan are parallel to one another.

12. The covered radiator/cooling fan arrangement for a construction machine according to claim 6, wherein
    the fan is connected to the cover and the open/close mechanism facilitates pivoting of the fan away from the radiator.

13. The covered radiator/cooling fan arrangement for a construction machine according to claim 1, wherein
    the fan is connected to the cover to pivot with the cover member between open and closed positions.

14. A construction machine having a covered radiator/cooling fan arrangement, comprising:
    an operator's seat;
    an engine mounted on a front of a body of the construction machine;
    left and right tank modules disposed on a rear of the construction machine;
    a radiator positionable adjacent to a rear of a body of the construction machine such that the operator's seat is interposed between the engine and the radiator, wherein the radiator supplies cooling water to the engine;

a fan disposed adjacent to the radiator in a position that faces the radiator; and a cover member disposed adjacent to and covering the radiator, wherein the cover member comprises a plurality of louver plates that form air channels disposed along an air flow formed by the fan with each of the louver plates being an elongated flat plate extending between side walls of the cover member, is installed with the fan in a vertically rotatable state, and is disposed in a position between left and right tank modules disposed on a rear of the construction machine when viewed from a rear side and in a position that is set back from the left and right tank modules when viewed laterally;

wherein, amongst the plurality of louver plates, the louver plates disposed on an upper portion of the cover member are disposed along a horizontal direction with respect to the body of the construction machine or along a direction that points downward from the horizontal direction with respect to the body of the construction machine, and the louver plates disposed on a lower portion of the cover member are disposed along a direction that points upward from the horizontal direction with respect to the body of the construction machine.

15. The construction machine having a covered radiator/cooling fan arrangement according to claim 14, wherein the louver plates on the upper portion of the cover member are disposed above a portion of the cover member that faces a rotation shaft of the fan.

16. The construction machine having a covered radiator/cooling fan arrangement according to claim 14, wherein the louver plates on the upper portion of the cover member are disposed above a portion of the cover member that faces the central portion of the radiator.

17. The construction machine having a covered radiator/cooling fan arrangement according to claim 14, wherein the fan and the cover member are installed at an angle from the body of the construction machine when viewed laterally.

18. The construction machine having a covered radiator/cooling fan arrangement according to claim 14, wherein the upper portion of the cover member is angled with respect to the lower portion.

19. The construction machine having a covered radiator/cooling fan arrangement according to claim 18, wherein the lower portion of the cover member is vertically disposed with respect to the body of the construction machine.

20. The construction machine having a covered radiator/cooling fan arrangement according to claim 19, wherein the upper portion of the cover member inclines upwardly from a top of the lower portion, in a direction toward the front of the construction machine.

21. The construction machine having a covered radiator/cooling fan arrangement according to claim 14, further comprising:

an open/close mechanism connected between the cover member and the construction machine to facilitate opening and closing of the cover member.

22. The construction machine having a covered radiator/cooling fan arrangement according to claim 21, wherein the open/close mechanism comprises a gas damper and a link mechanism, the gas damper being connected at a first end to the cover member and at a second end to the link mechanism, the link mechanism being connected to the construction machine.

23. The construction machine having a covered radiator/cooling fan arrangement according to claim 14, wherein the fan is disposed rearwardly from the radiator with respect to the body of the construction machine.

24. The construction machine having a covered radiator/cooling fan arrangement according to claim 14, wherein the cover member is disposed rearwardly from the fan with respect to the body of the construction machine.

25. The construction machine having a covered radiator/cooling fan arrangement according to claim 23, wherein the cover member is disposed rearwardly from the fan with respect to the body of the construction machine.

\* \* \* \* \*